(12) United States Patent
Hurewitz

(10) Patent No.: US 7,769,654 B1
(45) Date of Patent: Aug. 3, 2010

(54) SYSTEMS AND METHODS FOR DETERMINING FAIR VALUE PRICES FOR EQUITY RESEARCH

(75) Inventor: Barry S. Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 1253 days.

(21) Appl. No.: 10/856,442

(22) Filed: May 28, 2004

(51) Int. Cl.
G06Q 40/00 (2006.01)
(52) U.S. Cl. .......................................... 705/35
(58) Field of Classification Search ..................... 705/35
See application file for complete search history.

(56) References Cited

U.S. PATENT DOCUMENTS

| | | | |
|---|---|---|---|
| 4,710,763 A | 12/1987 | Franke et al. | |
| 5,128,860 A | 7/1992 | Chapman | |
| 5,502,637 A * | 3/1996 | Beaulieu et al. | 705/36 R |
| 5,630,070 A | 5/1997 | Dietrich et al. | |
| 5,822,410 A | 10/1998 | McCausland et al. | |
| 5,864,853 A | 1/1999 | Kimura et al. | |
| 5,913,201 A | 6/1999 | Kocur | |
| 5,940,843 A | 8/1999 | Xucknovich et al. | |
| 5,963,911 A | 10/1999 | Walker et al. | |
| 5,968,121 A | 10/1999 | Logan et al. | |
| 6,029,146 A * | 2/2000 | Hawkins et al. | 705/35 |
| 6,049,599 A | 4/2000 | McCausland et al. | |
| 6,292,830 B1 | 9/2001 | Taylor et al. | |
| 6,324,523 B1 * | 11/2001 | Killeen et al. | 705/36 R |
| 6,330,545 B1 | 12/2001 | Suh | |
| 6,374,227 B1 | 4/2002 | Ye | |
| 6,381,744 B2 | 4/2002 | Nanos et al. | |
| 6,415,269 B1 | 7/2002 | Dinwoodie | |
| 6,470,325 B1 * | 10/2002 | Leemhuis | 705/36 R |
| 6,507,825 B2 | 1/2003 | Suh | |
| 6,519,571 B1 * | 2/2003 | Guheen et al. | 705/14 |
| 6,671,674 B1 | 12/2003 | Anderson et al. | |
| 6,681,211 B1 | 1/2004 | Gatto | |
| 6,968,317 B1 | 11/2005 | Wallace et al. | |
| 7,072,858 B1 * | 7/2006 | Litzow et al. | 705/26 |

(Continued)

FOREIGN PATENT DOCUMENTS

| JP | 2003/345971 | 5/2003 |
|---|---|---|
| JP | 2003/288469 | 10/2003 |

OTHER PUBLICATIONS

"Code of Practice for Enhanced Commissions Processing," Thomson Financial esg, OASYS, Sep. 28, 2000, pp. 1-69.*

(Continued)

Primary Examiner—Jagdish N Patel
Assistant Examiner—Sara Chandler
(74) Attorney, Agent, or Firm—K&L Gates LLP

(57) ABSTRACT

Methods for determining a range of fair value prices for equity research to be supplied by a sell-side firm to a buy-side firm. The range of fair value prices may be used, for example, to frame the discussions between the sell-side firm and the buy-side firm over the price of equity research supplied by the sell-side firm. For example, the parties may engage in discussion discussions as to which determined fair value price or prices are most appropriate to the parties' circumstances. A number of different pricing techniques are disclosed.

22 Claims, 6 Drawing Sheets

U.S. PATENT DOCUMENTS

| | | | |
|---|---|---|---|
| 7,171,471 B1 | 1/2007 | Nair | |
| 2002/0016752 A1 | 2/2002 | Suh | |
| 2002/0035534 A1 | 3/2002 | Buist et al. | |
| 2002/0055901 A1* | 5/2002 | Gianakouros et al. | 705/37 |
| 2002/0065758 A1 | 5/2002 | Henley | |
| 2002/0111890 A1* | 8/2002 | Sloan et al. | 705/36 |
| 2002/0198815 A1* | 12/2002 | Greifeld et al. | 705/37 |
| 2003/0083926 A1 | 5/2003 | Semret et al. | |
| 2003/0101124 A1 | 5/2003 | Semret et al. | |
| 2003/0144932 A1 | 7/2003 | Martin et al. | |
| 2003/0158807 A1 | 8/2003 | Takeshi | |
| 2003/0225666 A1* | 12/2003 | Murtaugh et al. | 705/36 |
| 2003/0236721 A1 | 12/2003 | Plumer et al. | |
| 2004/0010592 A1 | 1/2004 | Carver et al. | |
| 2004/0088206 A1 | 5/2004 | Thompson et al. | |
| 2004/0111308 A1 | 6/2004 | Yakov | |
| 2004/0138998 A1* | 7/2004 | Lawrence | 705/38 |
| 2004/0181378 A1 | 9/2004 | Gilmore | |
| 2005/0096950 A1 | 5/2005 | Caplan et al. | |
| 2005/0097028 A1 | 5/2005 | Watanabe et al. | |
| 2005/0125274 A1 | 6/2005 | Nastacio et al. | |
| 2005/0172083 A1 | 8/2005 | Meiri | |
| 2005/0216323 A1 | 9/2005 | Weild, IV | |
| 2005/0240456 A1* | 10/2005 | Ward et al. | 705/7 |
| 2005/0246264 A1* | 11/2005 | Plunkett | 705/37 |
| 2005/0261922 A1* | 11/2005 | Marchisotto et al. | 705/1 |
| 2005/0261999 A1 | 11/2005 | Rowady, Jr. | |
| 2005/0278240 A1 | 12/2005 | Delenda | |
| 2006/0167703 A1 | 7/2006 | Yakov | |
| 2007/0264986 A1 | 11/2007 | Warrillow et al. | |
| 2008/0021805 A1* | 1/2008 | Hansen et al. | 705/37 |

OTHER PUBLICATIONS

"Speech by SEC Chairman: Remarks before the 2000 Annual Meeting Securities Industry Association," by Chairman Arthur Levitt. US Securities and Exchange Commission. Boca Raton, Florida. Nov. 9, 2000.*

"Brokerage Commission Schedules," by Michael J. Brennan; and Tarun Chordia. The Journal of Finance, vol. 48, No. 4. (Sep. 1993), pp. 1379-1402.*

Boni, L. and Womack, K., "Solving the Sell-Side Research Problem: Insights from Buy-Side Professionals," working paper, University of New Mexico, Aug. 8, 2002.

McCafferty, J., "Reform of sell-side research is creating a variety of new headaches for corporations," CFO Magazine, May 1, 2003.

Ivy Schmerken, "Bracing for Disclosure of Soft Dollars," Wall Street & Technology, Aug. 27, 2004.

Myner, "Institutional Investment in the United Kingdom: A Review," Mar. 6, 2001 (The Myner's Report).

U.S. Dept. of Energy, "Activity Based Costing," Cost Estimating Guide, Chap. 24, Mar. 1997.

Roztocki et al., "An Integrated Activity-Based Costing and Economic Value Added System as an Engineering Management Tool for Manufacturers," 1998 ASEM National Conference Proceedings, Virginia Beach, Oct. 1-3, 1998, pp. 77-84.

"2004 US Equity Research Industry Outlook—Table of Contents", Integrity Research Associates (3 pages).

Anonymous, "Sell-Side Story", Prweek (U.S. ed.), New York, Jul. 7, 2003, p. 17 (5 pages), vol. 6, Issue 26.

Boni, Leslie et al., "Wall Street Research: Will New Rules Change Its Usefulness?", Financial Analysts Journal, May/Jun. 2003 (7 pages), vol. 59, Issue 3, ABI/Inform Global.

Thomson, "Best Practices Report: The Broker Voting Process, Commentary and Analysis", Thomson Extel Surveys, Feb. 2008 (5 pages).

Business Editors/High-Tech Writers, "Independent Research Group Builds Equity Research Team", Business Wire, New York, Mar. 13, 2003, p. 1 (5 pages).

Chapman, P., "Keeping a Score for Traders: A Database That Keeps Track of Customer Business", Traders Magazine, New York, Dec. 1, 2003, p. 1 (3 pages).

Chen, Z., "Buy-Side and Sell-Side: The Industrial Organization of Information Production in the Securities Industry", University of Pennsylvania—The Wharton School, Mar. 2004, pp. 1-64.

"Equity Research Outlays Projected to Nearly Double in Next Five Years", PR Newswire, New York, Jun. 21, 2004, p. 1 (2 pages).

"Buy-Side Still Values Sell-Side Research, Study Says", FinanceTech, Mar. 26, 2008 (2 pages).

"Facing the Charges for Research: The Way Fund Managers Bill Their Clients Needs Reform: [London 1st Edition]", Financial Times, London (UK), Oct. 13, 2003, p. 20 (3 pages).

"The Future of Equity Research: Where Will the Investment Community Look?", PR Newswire, New York, Feb. 4, 2004, pg. (2 pages).

"National Express Group PLC Analyst and Investor Seminar": May 7, 2004, p. 1.

"Prudential Financial to Host Analyst and Investor Conference in Tokyo", Sep. 23, 2004, Business Wire, Jan. 23, 2004.

"An Interview with Mark Coker, Founder of Best Calls", 2000, 4 pages.

"Analyst Meeting", Dell Inc., Austin, Texas, Apr. 8, 2004, 55 pages.

"International Managers Feel Pinch of Sellside's Cost-Cutting Moves", Fund Action, New York, Jun. 30, 2003, p. 1 (2 pages).

Friedlander, J., "Independents to Gobble Research Pie in Future Study says Industry to Nearly Triple, Taking Money from Big Street Firms", The Investment Dealers' Digest: IDD, New York, Jul. 5, 2004, p. 1 (2 pages).

Nocera, J., "Wall Street on the Run", Fortune, New York, Jun. 14, 2004, vol. 149, Issue 12, p. 107 (6 pages).

Leone, M., "The Flight of the Sell-Side Aalyst", CFO.com, Boston, Jul. 8, 2004, p. 1 (2 pages).

McCafferty, J., "Reform of Sell-Side Research is Creating a Variety of New Headaches for Corporations," CFO Magazine, May 1, 2003.

Milhench, C., "Global Brokers Survey: Rethinking the Research Model", Global Investor, London, Sep. 2004, p. 1 (29 pages).

Krantz, M., "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea . . . .

Munk, C. Winokur, "Analysts' Roles Evolve with Incentives", Wall Street Journal (Eastern Edition), New York, May 21, 2003, p. 1 (4 pages).

Chapman, P., "Rating Sellside Services: Software Made for Buyside Spendthrifts", Traders Magazine, New York, May 1, 2004, p. 1 (3 pages).

Sec-Rel, Sec-Docket 79 Sec-Docket 2540-113, "United States of America Before the Securities and Exchange Commission", Release No. ID-225, Administrative Proceeding File No. 3-10607, Mar. 19, 2003 (13 pages).

"Sell-Side Analysts Heading to the Buy Side", Real Estate Finance and Investment, New York, Nov. 3, 2003, p. 1 (2 pages).

Sisk, M., "The Best of the Buy Side—II Magazine Platinum", Institutional Investor, (International Edition), New York, Jun. 2003, p. 1 (6 pages).

Stock, H., "Most Buy Siders Use Sell-Side Reports for Tips, Despite Conflicts", Investor Relations Business, New York, May 12, 2003, p. 1 (4 pages).

Gullapalli, D., "Moving the Market—Tracking the Numbers/Street Sleuth: On Governance, Wall Street May Carry Big Stick; After a Report by Goldman, Companies Make Changes; Right Role for 'Sell Side'?", Wall Street Journal, (Eastern Edition), New York, Aug. 31, 2004, p. C.3 (2 pages).

"Eliot Spitzer on His Fund Blitzkrieg", Business Week (Online), New York, Sep. 18, 2003, p. 1 (3 pages).

"The October Revolution on Wall Street: Strategies for adapting to the changing research landscape," Coffin Communications Group, Jun. 2003.

Boni, et al., "Wall Street's Credibility Problem: Misaligned Incentives and Dubious Fixes?," 5th Annual Brookings-Wharton Conference on the Future of Securities Markets, Brookings-Wharton Papers on Financial Services, 2002.

Non-Final Office Action mailed May 21, 2008 for U.S. Appl. No. 10/857,526.

Non-Final Office Action mailed Mar. 16, 2009 for U.S. Appl. No. 10/857,526.

Interview Summary mailed May 15, 2009 for U.S. Appl. No. 10/857,526.
Non-Final Office Action mailed May 6, 2008 for U.S. Appl. No. 10/857,400.
Interview Summary mailed Jul. 14, 2008 for U.S. Appl. No. 10/857,400.
Non-Final Office Action mailed Dec. 9, 2008 for U.S. Appl. No. 10/857,400.
Interview Summary mailed Apr. 2, 2009 for U.S. Appl. No. 10/857,400.
Non-Final Office Action mailed Jan. 30, 2008 for U.S. Appl. No. 10/939,087.
Interview Summary mailed Apr. 11, 2008 for U.S. Appl. No. 10/939,087.
Interview Summary mailed May 16, 2008 for U.S. Appl. No. 10/939,087.
Non-Final Office Action mailed Sep. 17, 2008 for U.S. Appl. No. 10/939,087.
U.S. Appl. No. 10/857,526, filed May 28, 2004.
U.S. Appl. No. 10/857,400, filed May 28, 2004.
U.S. Appl. No. 10/939,087, filed Sep. 10, 2004.
U.S. Appl. No. 11/450,994, filed Jun. 12, 2006.
Mehta, N. "Sellside Research Must Try Harder: Rocked by Scandals, Institutional Sellside Research Will Never by the Same", Traders Magazine, New York, Dec. 1, 2003, p. 1 (6 pages).
Final Office Action mailed Aug. 3, 2009 for U.S. Appl. No. 10/857,400.
Notice of Allowance mailed Jul. 9, 2009 for U.S. Appl. No. 10/939,087.
Tumolo, M., Business-to-Business Exchanges, Information Systems Management; Spring 2001, vol. 18, Issue 2, 25 pages.
Anonymous, "LA Based Credit Union Installs Harland's Touche Solution", May 2002, Bank Systems and Technology, V39N5, 2 pages.
Anonymous, "Business Objects Launches Ithena, Inc.: New Subsidiary Defines First E-Customer Intelligence Analytic Application" Feb. 9, 2000, Business Wire, 0006.
Notice of Allowance mailed Oct. 6, 2009 for U.S. Appl. No. 10/857,526.
U.S. Dept. of Energy, "Activity Based Costing," Cost Estimating Guide, Chap. 24, Mar. 1997.
Roztocki et al., "An Integrated Activity-Based Costing and Economic Value Added System As An Engineering Management Tool for Manufacturers," 1998 ASEM National Conference Proceedings, Virginia Beach, Oct. 1-3, 1998, pp. 77-84.
Granof et al., "Using Activity-Based Costing to Manage More Effectively," PriceWaterhouseCoopers Report, Jan. 2000.
"2004 US Equity Research Industry Outlook—Table of Contents", Integrity Research Associates (3 pages).

"The Commission System", Treatise, Broker-Dealer-Law-and-Regulation, Section 10.02 The Commission System, 2008 (10 pages).
Anonymous, "Sell-Side Story", Prweek (U.S. ed.), New York, Jul. 7, 2003, p. 17 (5 pages), vol. 6, Issue 26.
Boni, Leslie et al., "Wall Street Research: Will New Rules Change Its Usefulness?", Financial Analysts Journal, May/Jun. 2003 (7 pages), vol. 59, Issue 3, ABI/INFORM Global.
Thomson, "Best Practices Report: the Broker Voting Process, Commentary and Analysis", Thomson Extel Surveys, Feb. 2008 (5 pages).
Business Editors/High-Tech Writers, "Independent Research Group Builds Equity Research Team", Business Wire, New York, Mar. 13, 2003, p. 1 (5 pages).
Chapman, P., "Keeping a Score for Traders: A Database That Keeps Track of Customer Business", Traders Magazine, New York, Dec. 1, 2003, p. 1 (3 pages).
Nocera, J., "Wall Street on the Run", Fortune, New York, Jun. 14, 2004, vol. 149, Issue 12, p. 107 (6 pages).
Leone, M., "The Flight of the Sell-Side Aalyst", CFO.com, Boston, Jul. 8, 2004, p. 1 (2 pages).
McCafferty, J., "Reform of Sell-Side Research is Creating a Variety of New Headaches for Corporations," CFO Magazine, May 1, 2003.
Mehta, N., "Sellside Research Must Try Harder: Rocked by Scandals, Institutional Sellside Research Will Never be the Same", Traders agazine, New York, Dec. 1, 2003, p. 1 (6 pages).
Milhench, C., "Global Brokers Survey: Rethinking the Research Model", Global Investor, London, Sep. 2004, p. 1 (29 pages).
Krantz, M., "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea...
Munk, C. Winokur, "Analysts' Roles Evolve with Incentives", Wall Street Journal (Eastern Edition), New York, May 21, 2003, p. 1 (4 pages).
Chapman, P., "Rating Sellside Services: Software Made for Buyside Spendthrifts", Traders Magazine, New York, May 1, 2004, p. 1 (3 pages).
SEC-REL, SEC-Docket 79 SEC-Docket 2540-113, "United States of America Before the Securities and Exchange Commission", Release No. ID-225, Administrative Proceeding File No. 3-10607, Mar. 19, 2003 (13 pages).
"Sell-Side Analysts Heading to the Buy Side", Real Estate Finance and Investment, New York, Nov. 3, 2003, p. 1 (2 pages).
Sisk, M., "The Best of the Buy Side—II Magazine Platinum", Institutional Investor, (International Edition), New York, Jun. 2003, p. 1 (6 pages).

* cited by examiner

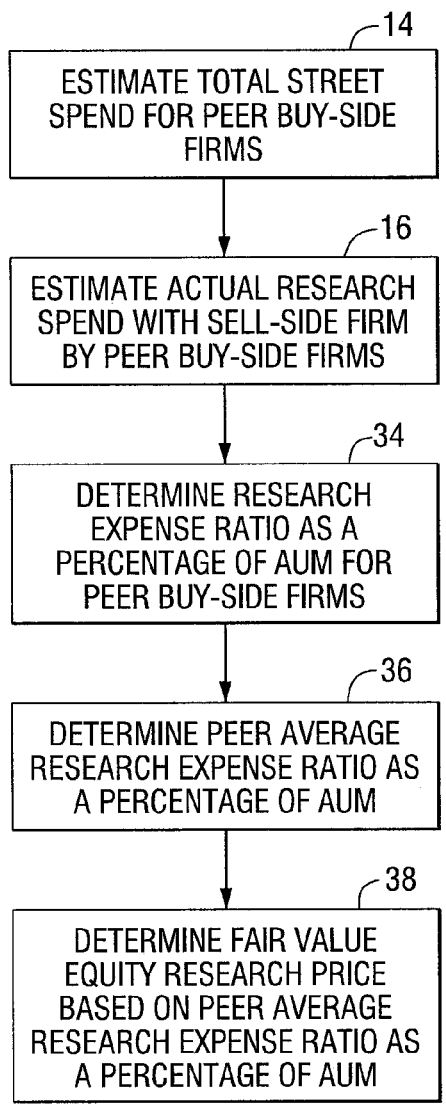
FIG. 6
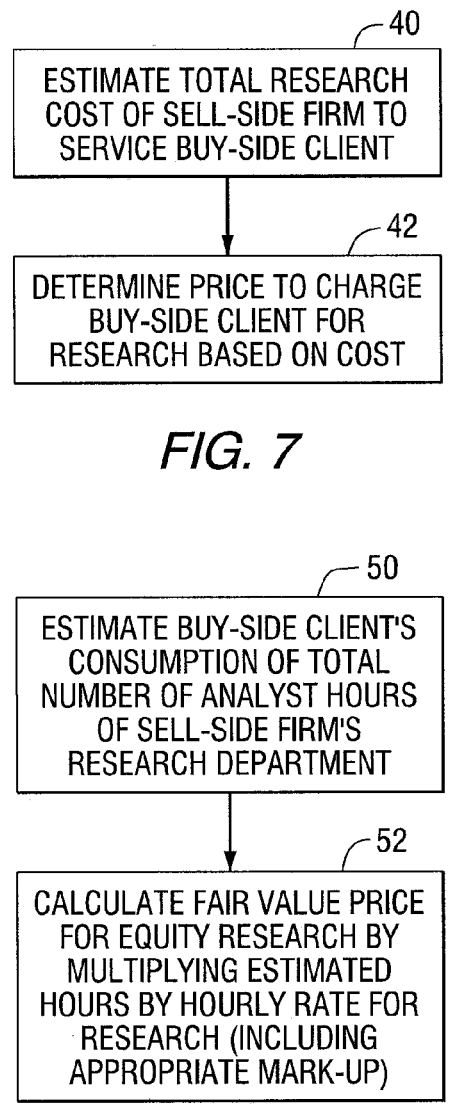
FIG. 7
FIG. 8

SYSTEMS AND METHODS FOR DETERMINING FAIR VALUE PRICES FOR EQUITY RESEARCH

BACKGROUND OF THE INVENTION

The present invention generally concerns techniques for determining one or a range of fair values prices for equity research.

Traditionally, there are two types of arrangements whereby an institutional investor, such as a pension fund, a mutual fund, a hedge fund, etc., pays for equity research. First, in typical bundled brokerage arrangements, a sell-side firm (such as a brokerage or investment house) provides a fund manager for an institutional investor with a package of services, including trade execution and equity research, for a single price. Second, in typical soft commission arrangements, the sell-side firm agrees to pay for certain goods and services (e.g., research) that are supplied to the institutional investor (usually by a third party rather than the sell-side firm) in return for which the institutional investor agrees to direct a certain level of business (order flow) to the sell-side firm.

In 2001, Mr. Paul Myner issued his report on institutional investing in the United Kingdom (the "Myner's Report"). Among other things, the Myner's Report recommended ending such bundled and soft commission arrangements. Among the reasons cited was lack of transparency; bundled brokerage and soft commission arrangements make it difficult for fund investors to tell how much they are paying for individual services. The Myner's Report concluded that there was an incentive for fund managers to direct business to brokers to obtain additional services, rather than the most favorable trade execution terms for fund investors, and that this represented an unacceptable market distortion.

In response to the Myner's Report, the Financial Services Authority ("FSA") of the U.K. issued Consultation Paper 176 ("FSA 176"). FSA 176 proposes, among other things, a prohibition on fund managers passing through the cost of sell-side services (other than execution costs) to their customers.

Although bundled brokerage arrangements are not currently prohibited in the U.S., alternative mechanisms to price equity research are presented below.

SUMMARY OF THE INVENTION

In one general aspect, embodiments of the present invention are directed to systems and methods for determining a range of fair value prices for equity research to be supplied by a sell-side firm to a buy-side firm. The range of fair value prices may be used, for example, to frame the discussions between the sell-side firm and the buy-side firm over the price of equity research supplied by the sell-side firm. For example, the parties may engage in discussions as to which determined fair value price or prices are most appropriate to the parties' circumstances.

The system may be implemented as a computing device including a number of modules. Each module may compute one or more fair value prices using several different pricing techniques. Several of the pricing techniques compare the amount spent by the buy-side firm (with the sell-side firm) and the amount spent by peers of the buy-side firm (with the sell-side firm). Thus, a first step is to identify appropriate peer (or reference or comparison) groups. Different buy-side peer groups may include (i) peers grouped according to total commissions paid to the sell-side firm, (ii) peers with similar levels of assets under management, (iii) peers that consume a similar level of the sell-side firm's equity research resources (in turns of costs or analyst time), or (iv) peers with similar turnover-adjusted assets, just to name a few.

The second step is to determine fair value prices for the equity research based on appropriate comparisons of the research spend by the buy-side client and its respective peers in the group. One pricing technique is based on the average price that the peers spend with the buy-side firm for equity research. The amount that each peer spends may be estimated by multiplying, for each peer, the total street spend of the respective buy-side peer by the estimated percentage allocated by the buy-side peer to research, and then multiplying that product by the sell-side firm's share of the total street spend for the respective buy-side peer.

A second pricing technique may be based on the average wallet share of the sell-side firm with peer buy-side firms. According to this technique, a fair value price for equity research may be estimated by multiplying the total street spend of the buy-side firm by the peer average wallet share for the sell-side firm of the peer buy-side firms, and then multiplying that product by the sell-side firm's share of the total street spend or wallet of the buy-side firm.

Other pricing techniques may be based on the average percentage of commissions spent with the sell-side firm allocated to research by the peers. According to one such technique, a fair value price for the equity research can be generated by multiplying the buy-side client's commission spend with the sell-side firm times the peer average percentage of commissions allocated to research by the peers. According to another technique, a fair value price can be determined by multiplying the buy-side client's total street spend by the peer average wallet share, and then multiplying that product by the peer average percentage of commissions allocated to research by the peers Another pricing technique may be based on the average research expense ratio of peer buy-side firms as a percentage of assets under management (AUM). According to this technique, a fair value price may be determined by multiplying the AUM for the buy-side firm by the average expense ratio (as a percentage of AUM) of the peer buy-side firms. As before, several fair value prices may be generated based on this pricing technique, each using the peer average expense ratio for a different peer grouping.

Further pricing techniques may be based on the buy-side firm's consumption of the sell-side firm's equity research resources, in terms of either cost or time. For example, one such pricing technique may determine a fair value price based on the cost of the sell-side firm to supply the equity research to the buy-side firm plus an appropriate mark-up. Another such pricing technique may be based on the number of working hours of analysts of the sell-side firm's research division consumed by the buy-side firm. In addition, fair value prices may also be determined by averaging the fair value prices generated by these two consumption-based pricing techniques for a number of peers of the buy-side client. Also, these two consumption techniques may also be used to group buy-side firms as peers for other pricing techniques.

Other pricing techniques are also disclosed. Using different peer groupings may generate different fair value prices for each technique. All of these fair value prices may be used in the discussions between the parties regarding the price for equity research.

In addition, according to other variations of the present invention, if a buy-side firm is interested in research for only one or a limited number of market sectors, a range of fair value prices for the relevant sector (or sectors) may be determined by multiplying the various computed fair value prices for all sectors (completed based on the various pricing techniques described herein) by a market cap traded factor for the relevant sector (or sectors). The market cap traded percentage (or factor) may be conceptualized as the market cap traded for a particular sector divided by the market cap traded for all sectors, and may be computed based on published market indices as described herein below.

Other benefits and features of the present invention will be apparent from the description below.

DESCRIPTION OF THE FIGURES

Embodiments of the present invention will be described by way of example in conjunction with the following figures, wherein:

FIGS. 2-10 are flowcharts illustrating various fair value pricing techniques for equity research according to various embodiments of the present invention.

DETAILED DESCRIPTION

Various embodiments of the present invention are directed to systems and methods for determining one or a range of fair value prices for equity research. The determined fair value prices may be used, for example, for framing discussions between a buy-side firm and a sell-side firm concerning the price of equity research to be supplied by the sell-side firm to the buy-side firm. The various pricing techniques described below may provide a range of fair value prices that may be helpful in such discussions. For example, the counterparties may discuss using the technique(s) most appropriate for the particular circumstances.

For purposes of the description to follow, the supplier of the equity research is sometimes referred to as a "sell-side firm" or as the "supplier." The sell-side firm may be, for example, a brokerage or investment house. The consumer of the equity research may be an institutional investor, such as a pension fund, a mutual fund, or a hedge fund, or any other type of buy-side firm. A consumer of equity research is referred to herein as a "client" of a sell-side firm supplying the equity research or as a "buy-side firm."

Figure 1:
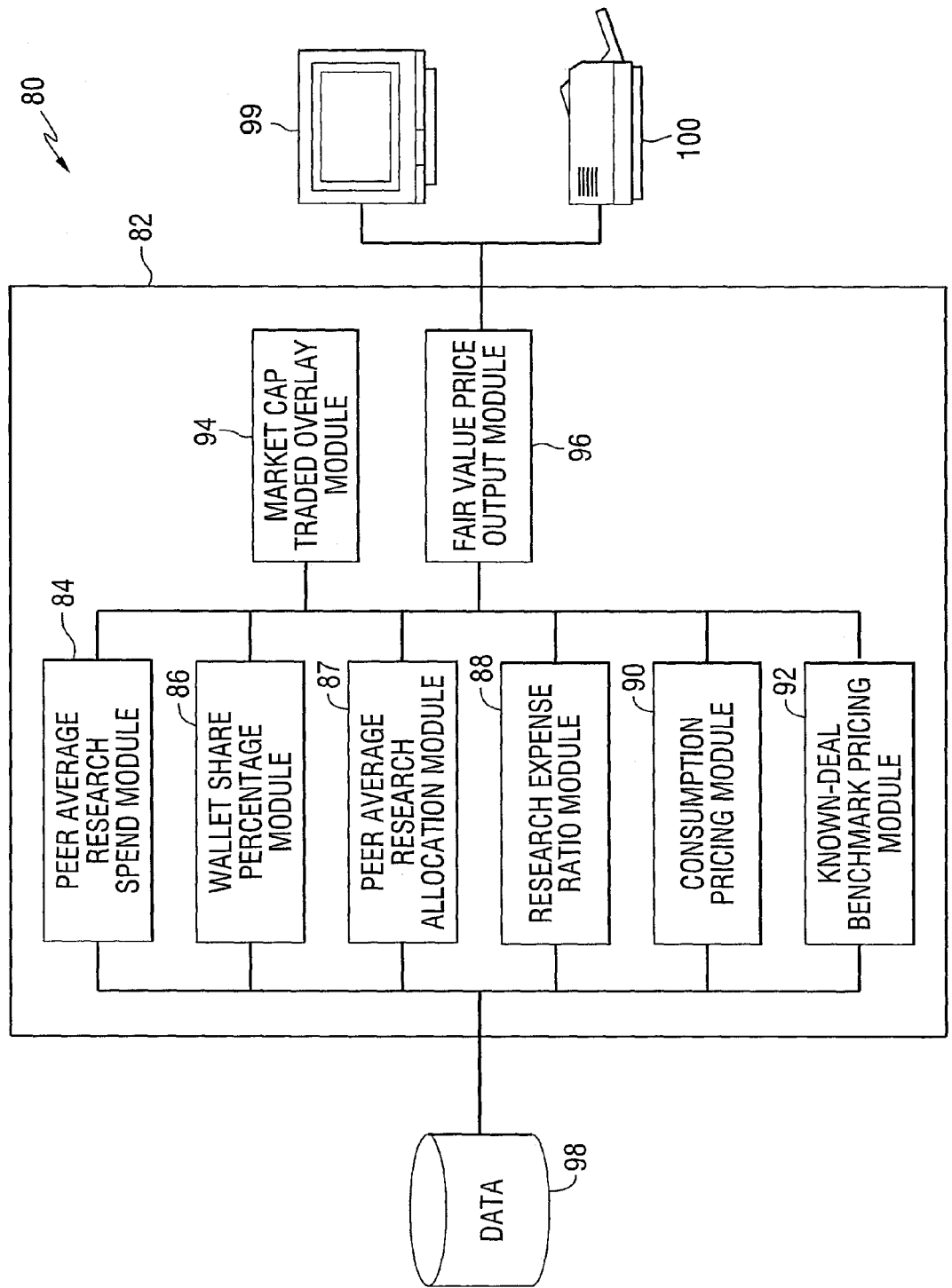
FIG. 1 is a diagram of a system according to various embodiments of the present invention.

FIG. 1 is a diagram of a system 80 for computing one or a range of fair value prices for equity research according to various embodiments of the present invention. The system 80 may comprise a computing device 82 including a number of modules. The modules may include a peer average research spend module 84, a wallet share percentage module 86, a peer average research allocation module 87, a research expense ratio module 88, a consumption pricing module 90, a known-deal benchmark pricing module 92, a market cap traded overlay module 94, and a fair value price output module 96. The modules 84-96 may be implemented as software code to be executed by a processor (not shown) of the computing device 82 using any suitable computer language, such as, for example, Java, C, C++, or Perl using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM. The computing device 82 may be implemented as one or a number of networked computing devices, such as personal computers, laptops, workstations, servers, etc. The computing device 82 may be in communication with one or more databases 98, which may contain various data needed to compute the fair value prices described below.

The peer average research spend module 84 may compute fair value prices for equity research for a particular client based on the peer average research spend by peers of the client. The wallet share percentage module 86 may compute fair value prices for the equity research based on the peer average wallet share of peers of the client. The peer average research allocation module 87 may compute fair value prices for the equity research based on the average amount of commission spend that peers of the client allocate to research. The research expense ratio module 88 may compute fair value price for equity research based on the peer average expense ratio as a percentage of assets under management (AUM) of peers of the client. These pricing techniques are described in more detail below.

The consumption pricing module 90 may compute fair value prices for equity research based on a particular buy-side firm's consumption of the sell-side firm's research resources. As described in more detail below, the consumption pricing module 90 may use either a price-based-on-cost technique or a price-based-on-hourly-rate-for-research technique. In that connection, when performing the price-based-on-cost computations, the consumption-pricing module 90 may (i) compute the total estimated research cost of the sell-side firm for a particular buy-side client and (ii) determine a fair value price to charge based on the computed cost. When performing the price-based-on-hourly-rate-for-research computations, the consumption pricing module 90 may (i) compute the estimated number of hours consumed by the sell-side firm for research for the buy-side client and (ii) compute fair value price for the equity research based on the estimated number of analyst hours consumed.

The known-deal benchmark pricing module 92 may compute a fair value price for equity research based on known, benchmark deals for equity research, as described below in connection with FIG. 9.

Figure 10:
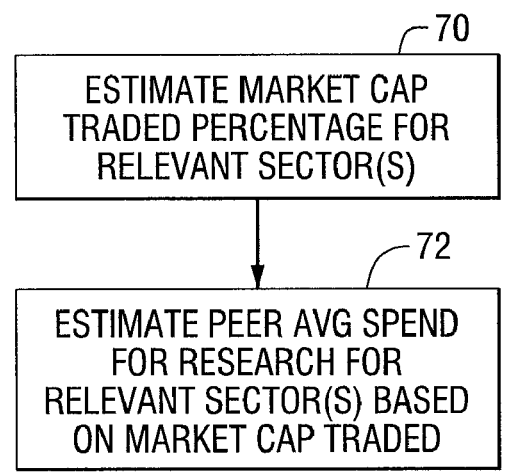

The market cap traded overlay module 94 may integrate with any of the modules 84-92 to calculate the a fair value price for equity research that is specific to a particular market sector based on the fair value price determined by the respective module 84-92, as explained below in connection with FIG. 10.

The fair value price output module 96 may integrate with each of the modules 84-92 and may, for example, compute an average fair value price based on the various fair value prices determined by the respective modules 84-92. Additionally, the fair value price output module 96 may compute an average fair value price for equity research relevant to a particular market sector based on the fair value prices for the market sector as determined by the market cap traded overlay module 94. In addition, the fair value price output module 96 may generate a chart, as described below in conjunction with FIG. 11, displaying the range of fair value prices as determined by the respective modules 84-94. The charts may be output by the fair value price output module 96 to output devices for display to a user of the system 80, such as a monitor 99 and/or a printer 100. Such a chart may aid in the discussions between the counterparties over the price for equity research supplied by a sell-side firm to a buy-side firm.

Figure 2:
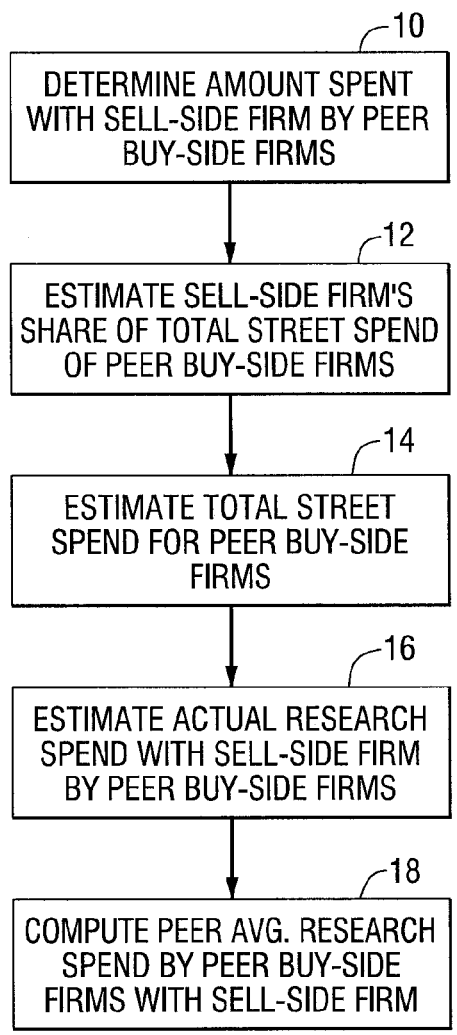

FIG. 2 is a flowchart of the process flow through the peer average research spend module 84 for determining a fair value price (or prices) for equity research for a particular buy-side firm (e.g., Client A) according to various embodiments of the present invention. The process commences at step 10, where the total amount spent with the sell-side firm by peer buy-side firms of Client A for the sell-side firm's trade execution and research services is determined. Peer buy-side firms may be grouped, for example, by (i) total commissions spent with the sell-side firm, (ii) the size of the buy-side firms, such as according to assets under management (AUM), (iii) the amount of the sell-side firm's research resources consumed, and/or (iii) the type of fund, such as hedge funds, mutual funds, pension funds, etc. Other factors or characteristics may be used to group peer buy-side firms, as described in more detail below.

Next, at step 12, the sell-side firm's share of the total "street spend" or "wallet" of the peer buy-side firms is estimated. "Street spend" or "wallet" corresponds to the total amount that a client spends on the services of all sell-side firms for executing trades and research. This amount may be estimated, for example, based on data from third party or independent services that tally trading slips, such as McLagan Partners. Such a trading-slip-based estimation may be based on, for example, the number of trades and/or the dollar volume of the trades. From this data it is possible to determine that a particular sell-side firm does x % of a particular buy-side firm's trades and correspondingly has approximately x % of the buy-side firm's wallet.

Based on the foregoing information, at step 14, the total street spend by the peer buy-side firms can be estimated. This amount can be estimated, for example, by dividing the total amount spent by the respective peer buy-side firm with the sell-side firm by the sell-side firm's share of the peer buy-side firm's total street spend. For instance, with reference to the example of Table 1 below, Client A spent $39.0M with the sell-side firm and that was 9.02% of Client A's total street spend. Thus, Client A's total street spend may be estimated as $39.0M/0.0902=$432M.

TABLE 1

| Client/Peer Firm | Total Spent With Firm | Firm's Share of Street Spend | Total Street Spend | Research Portion |
|---|---|---|---|---|
| A | $39.0 M | 9.02% | $432 M | $15.2 M |
| B | $26.9 M | 9.00% | $299 M | $10.5 M |
| C | $13.9 M | 8.34% | $167 M | $5.4 M |
| D | $21.5 M | 9.10% | $236 M | $8.4 M |
| E | $15.6 M | 7.95% | $196 M | $6.1 M |

Next, at step 16, the "actual" amount spent by the respective peer buy-side firms for the sell-side firm's research may be estimated. Because of the present pricing structure where research and execution cost are typically bundled, this amount must ordinarily be estimated. This amount may be estimated by any number of techniques. One technique is for the peer buy-side firms to disclose what percent of their total street spend is allocated to equity research. This value may then be multiplied by the sell-side firm's share of the respective peer buy-side firm's total street spend to arrive at an estimated actual amount spent by each of the respective peer buy-side firms for the sell-side firm's research.

Many institutional investors do not or cannot accurately track the amount they allocate to equity research, or they may prefer not to disclose the amount. Therefore, other techniques for estimating the research portion of the total street spend may be used. One alternative technique is to compare the price of full service trade executions by the sell-side firm for a particular buy-side firm to the price for electronic (non-full service) trades executed by the sell-side firm for the particular buy-side firm. The difference, excluding associated costs for directed brokerage commissions and capital commitments (and potentially other associated costs), is indicative of the amount of commissions allocated by the particular buy-side firm to research. Another technique is to survey all or a representative population of buy-side firms as to how much they spend on equity research. A research portion percentage may then be determined indicative of, on average, an amount spent for equity research in relation to total street spend for the surveyed buy-side firms. Such survey data may be used where more accurate research allocation information about a particular buy-side firm is unknown. One such survey, by Greenwich Associates, indicates that buy-side firms spend approximately 39% of their total street spend on research. In addition, where the response to the survey of a particular buy-side firm is known, that actual response may be used to estimate the research portion of the particular buy-side firm's research spend.

With reference to the example of Table 1, if the survey result of 39% is used to estimate the research portion, the amount spent by the peer buy-side firms for the sell-side firm's research can be estimated by multiplying the total amount spent by the respective buy-side firms with the sell-side firm (col. 2 of Table 1) by 39%. Thus, in the example of Table 1, Client A is estimated to spend $39.0M×39%, or $15.2M, for the sell-side firm's research.

Next, at step 18, the average estimated actual amount spent by the peer buy-side firms for the sell-side firm's research may be computed. This peer average research spend may represent one fair value price for equity research for the peer buy-side firms. Assuming Clients A-E in the example of Table 1 are peers, the peer average research spend for the sell-side firm's research by Clients A-E is $9.1M, which is computed by averaging the values in column 5 of Table 1.

If a different peer group is used, for this technique, as well as techniques to follow, a different fair value price may result. The peer average research spend module 18 may calculate the fair value price for such different peer groups in order that those computed fair value prices may also be used to frame the discussion. Also, the subject buy-side firm may be included in the peer grouping when calculating the peer average research spend or, according to other variations of the present invention, the peer buy-side firm may be excluded from the peer grouping. The peer grouping may include, for example, tens or hundreds of peer buy-side firms.

Figure 3:
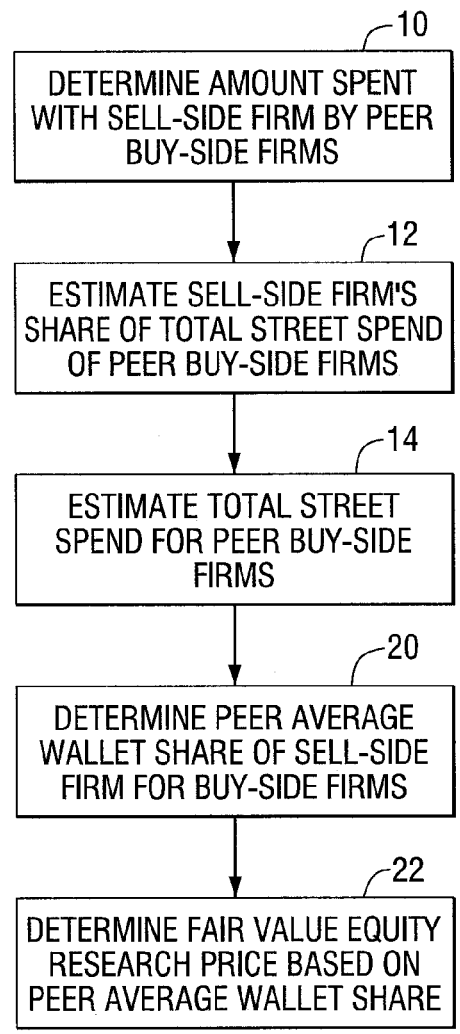

FIG. 3 is a diagram of the process flow through the wallet share percentage module 86 for determining fair value prices for equity research according to embodiments of the present invention. Instead of the peer average research spend, the wallet share percentage module 86 uses the peer average wallet share of peers of the client to determine the fair value prices. The first three steps of the process of FIG. 3 are the same as those of FIG. 2. In the process of FIG. 3, however, after estimating the total street spend by the peer buy-side firms at step 14, the process may advance to step 20, where the peer average wallet share of the sell-side firm for the peer buy-side firms may be determined. With reference to the example of Table 2 below, the peer average wallet share for the sell-side firm is 8.68%, which may be computed by averaging the sell-side firm's wallet share with the respective peer buy-side firms (col. 3 of Table 2).

TABLE 2

| Client/Peer Firm | Total Spent With Firm | Firm's Share of Street Spend | Total Street Spend | Peer Average Wallet Share | Fair Value Price |
|---|---|---|---|---|---|
| A | $39.0 M | 9.02% | $432 M | 8.68% | $14.6 M |
| B | $26.9 M | 9.00% | $299 M | 8.68% | $10.1 M |

TABLE 2-continued

| Client/<br>Peer<br>Firm | Total<br>Spent<br>With Firm | Firm's Share<br>of Street<br>Spend | Total<br>Street<br>Spend | Peer<br>Average<br>Wallet Share | Fair<br>Value<br>Price |
|---|---|---|---|---|---|
| C | $13.9 M | 8.34% | $167 M | 8.68% | $5.7 M |
| D | $21.5 M | 9.10% | $236 M | 8.68% | $8.0 M |
| E | $15.6 M | 7.95% | $196 M | 8.68% | $6.6 M |

At step 22, a fair value price for equity research provided by the sell-side firm to the respective peer buy-side firms based on the peer average wallet share may be computed. This fair value may be computed by multiplying the buy-side firm's total street spend (col. 4 of Table 2) by the peer average wallet share (col. 5), and then multiplying that value by the research portion percentage relative to total street spend for the buy-side firm (see step 16 of FIG. 1). For the example of Table 2, if the research portion percentage for each of the peer buy-side firms is assumed to be 39% (per the Greenwich Associates survey), the fair value equity research price for Client A under this pricing technique would be $432M× 8.68%×39%=$14.6M. This value is a second fair value price (the price derived from the technique of FIG. 2, $9.1M, being the first fair value price) that may be used to frame the discussions between the sell-side firm and Client A in a discussion concerning the price of the equity research provided by the sell-side firm to Client A. As before, using a different peer group may result in a different fair value price for this technique. All such determined fair value prices may be used to frame the discussions.

Figure 4:
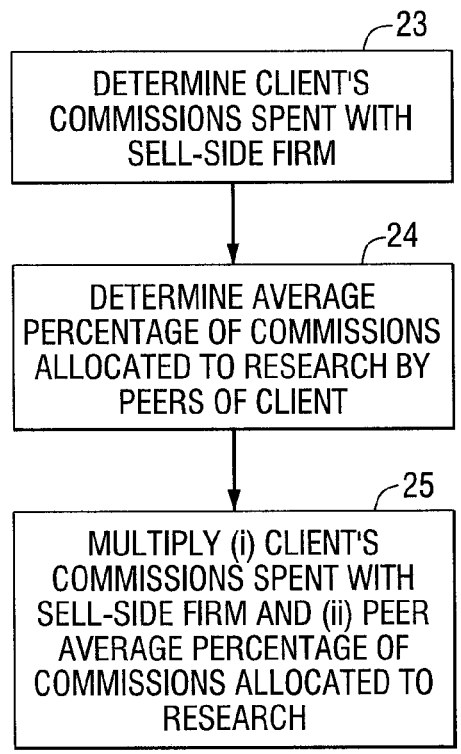
Figure 5:
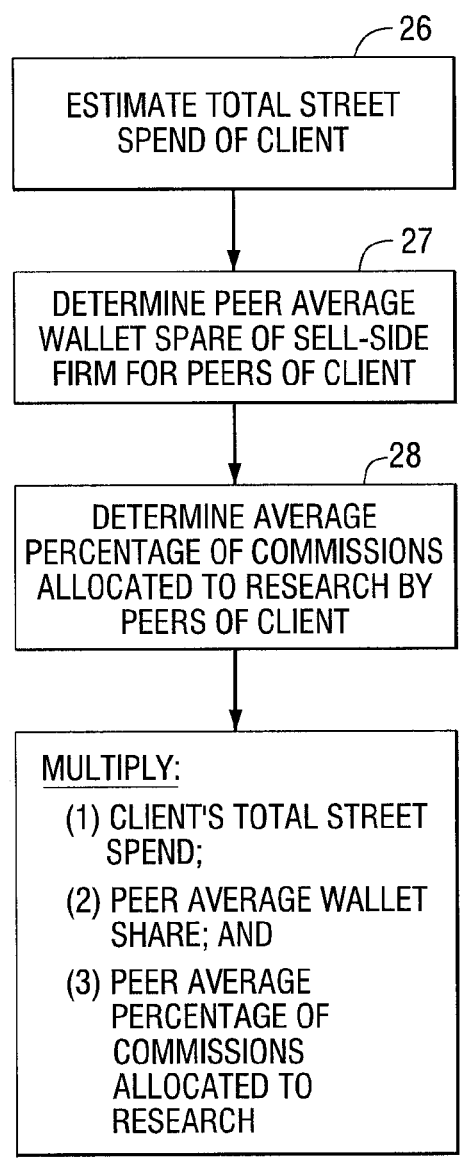

FIGS. 4 and 5 illustrate process flows through the peer average research allocation module 87 according to various embodiments. The processes of FIGS. 4 and 5 may determine fair value prices for equity research based on, among other things, the average percentage of commissions spent by peers of the client buy-side firm with the sell-side firm that are allocated to research. The process of FIG. 4 may commence at step 23, where the amount spent by the client buy-side firm in commissions with the sell-side firm for research and trade execution is determined. At step 24, the average percentage of commissions allocated to research by peers of the client is determined. Techniques for determining the amount of commissions that any one peer buy-side firm allocates to research are described above in connection with step 16 of FIG. 2. Then, at step 25, the commissions spent by the client with the sell-side firm may be multiplied by the peer average percentage of commissions allocated to research to arrive at yet another fair value price for equity research. For example, with reference to Table 1, suppose the peer average percentage of commissions allocated to research by Clients A-E is 35.0%. In that case, a fair value price for equity research for Client A may be $39.0M times 35%, which equals $13.65M. Again, other fair value prices may be determined with this technique using different peer groupings.

The process of FIG. 5 commences at step 26, where the total street spend of the client buy-side firm is estimated. Techniques for estimating the total street spend of a buy-side firm are described above in connection with step 14 of FIG. 2. At step 27, the peer average wallet share for the sell-side firm for peers of the client buy-side firm is determined. Techniques for determining the peer average wallet share are described above in connection with step 20 of FIG. 3. At step 28, the average percentage of commissions allocated to research by peers of the client is determined (see step 24 of FIG. 4). Then, at step 29, the client buy-side firm's total street spend may be multiplied by the peer average wallet share of peers of the client buy-side firm, and that product may be multiplied by the peer average percentage of commissions allocated to research by the peers to arrive at yet another fair value price for equity research. For example, with reference to the example of Table 2, suppose the peer average wallet share for peer Clients A-E is 8.68% and that the peer average percentage of commissions allocated to research by Clients A-E is 35.0%. In that case, a fair value price for equity research for Client A may be $432M times 8.68% times 35.0%, which equals $13.1M. Again, other fair value prices may be determined with this technique using different peer groupings. In various embodiments, the peer average research allocation module 87 may compute fair value prices using either or both of the processes of FIGS. 4 and 5.

FIG. 6 is a flowchart of the process flow through the research expense ratio module 88 according to various embodiments of the present invention. The process of FIG. 6 commences at step 14, where the total street spend by the peer buy-side firms is estimated. This value may be estimated, for example, as described above in connection with FIG. 2. Next, at step 16, the actual research spend with the sell-side firm by the peer buy-side firms is estimated. This amount may be estimated as described above in connection with FIG. 1.

The process of FIG. 6 next advances to step 34, where the research expense ratio as a percentage of assets under management (AUM) for the peer buy-side firms is determined. For instance, with reference to the example of Table 3 below, Client A has $487B in AUM and the estimated research portion spent with the firm is $15.2M. That computes to a research expense ratio of $487B/$15.2M=0.0031%.

TABLE 3

| Client | Total Spent<br>With Firm | Research<br>Portion | AUM | Research<br>Expense Ratio | Peer Avg. Research<br>Expense Ratio | Fair Value<br>Price |
|---|---|---|---|---|---|---|
| A | $39.0 M | $15.2 M | $487 B | 0.0031% | 0.0032% | $15.6 M |
| B | $26.9 M | $10.5 M | $200 B | 0.0052% | 0.0032% | $ 6.4 M |
| C | $13.9 M | $ 5.4 M | $300 B | 0.0018% | 0.0032% | $ 9.6 M |
| D | $21.5 M | $ 8.4 M | $265 B | 0.0032% | 0.0032% | $ 8.5 M |
| E | $15.6 M | $ 6.1 M | $235 B | 0.0026% | 0.0032% | $ 7.5 M |

Next, at step 36, the peer average research expense ratio as a percentage of AUM for the peer buy-side firms may be determined. In the example of Table 3, this value is 0.0032%, determined by averaging the research expense ratio for each of the peer buy-side firms (col. 5 of Table 3). Next, at step 38, a fair value price for equity research provided by the sell-side firm to the client based on the peer average expense ratio may be determined. This fair value price may be computed by multiplying the AUM for the client (col. 4 of Table 3) by the peer average research expense ratio (col. 6). For the example of Table 3, the fair value equity research price for Client A under this pricing technique would be $487B× 0.0032%=$15.6M. This value is yet another fair value price that may be used to frame the discussions between the sell-side firm and Client A in a discussion concerning the price of the equity research provided by the sell-side firm to Client A. As before, a different peer group may result in a different fair value price for this technique.

In the equity research pricing techniques described above, a buy-side firm (i.e., a client) is compared to its peers to develop the fair value prices for the equity research. A buy-side firm's peers could be determined in a number of different ways. For example, one way to group buy-side firms as peers is based on the commissions received by the sell-side firm; buy-side firms paying similar commissions to the sell-side firm may be grouped together as peers. Another grouping parameter is AUM; all of the sell-side firm's buy-side clients within particular AUM ranges could be grouped together as peers. Also, instead of AUM, wallet share or peer average research spend could be used to group buy-side firms as peers. Another way is to group buy-side firms based on their fund type. For example, mutual funds could be grouped together as peers, hedge funds could be grouped together, pension funds, etc.

Another way to group peers is based on turnover-adjusted assets. That is, buy-side firms having similar levels of turnover-adjusted assets may be grouped as peers. The turnover-adjust assets for a buy-side firm may be computed as the sum of the product of the number of shares traded by the buy-side firm times the price of the shares for each trade over a given time period (such as one year). That sum may then be divided by the total assets (AUM) of the buy-side firm to arrive at the turnover-adjusted assets. In other words, the turnover-adjusted assets may be computed as:

$$\frac{\sum_{each\ trade\ over\ time\ period} number\ of\ shares \times price\ of\ share}{AUM}$$

Another way to group buy-side firms is by how much time or research resources of the sell-side firm's equity research department the respective buy-side clients are consuming. Buy-side clients having a similar consumption level may be grouped together as peers. Techniques for determining consumption of a sell-side firm's research department are described in my concurrently filed U.S. patent application Ser. No. 10/857,526 entitled "Activity Based Costing for Equity Research," which is incorporated herein by reference. In addition, combinations of the above-described grouping techniques may be used to group buy-side firms as peers. For example, one peer group could comprise mutual funds having an AUM in a particular range.

FIG. 7 is a flowchart of the process flow through the consumption pricing module 90 according to other various embodiments of the present invention. The process of FIG. 7 is based on the buy-side client's consumption of the sell-side firm's equity research resources. Therefore, unlike the above-described pricing techniques, the process of FIG. 7 does not have to be based on a peer average. The process of FIG. 7 starts at block 40, where the total research cost of the sell-side firm's research department for the buy-side client is estimated. The total research cost may be estimated by any available and practicable costing technique. One such technique is described in my concurrently filed application Ser. No. 10/857,526 entitled "Activity Based Costing for Equity Research," referenced above.

Next, at step 42, a price to charge the buy-side client based on the sell-side firm's cost to service the research needs of the buy-side client is computed. The price may include an appropriate mark-up or profit margin for the sell-side client above the cost. This determined price is yet another fair value price that may be used to frame the discussions between a sell-side firm and a buy-side in a discussion concerning the price of the equity research provided by the sell-side firm to the buy-side client.

FIG. 8 is a flowchart of another process flow through the consumption pricing module 90 for determining a fair value price for equity research according to other various embodiments of the present invention. Like the process of FIG. 7, the process of FIG. 8 may also be independent of peer groupings, but does not have to be. The process of FIG. 8 commences at step 50, where the buy-side client's consumption of the total number of analyst hours of the sell-side firm is estimated. "Analyst hours" may correspond to, for example, the amount of time spent by analysts of the sell-side firm's research department on behalf of a buy-side client. Possible techniques for estimating this number are disclosed in my application Ser. No. 10/857,526 entitled "Activity Based Costing for Equity Research," incorporated herein by reference. Next, at step 52, the number of hours is multiplied by an analyst hourly rate for research. The hourly rate may be, for example, an average rate. Further, the hourly rate may include a desired profit margin for the sell-side firm. Thus, the average hourly rate may be calculated, for example, as the total research department spend on clients by the sell-side firm divided by a mark-up factor divided by the total number of hours that the research department spends servicing clients. This determined price is yet another fair value price that may be used to frame the discussions between a sell-side firm and a buy-side in a discussion concerning the price of the equity research provided by the sell-side firm to the buy-side client.

The processes of FIGS. 7 and 8 may also be used to compute fair value prices based on the average consumption level by a group of peer buy-side firms. Such fair value prices may also be used in the discussions between a sell-side firm and a buy-side firm concerning the price for equity research.

Figure 9:
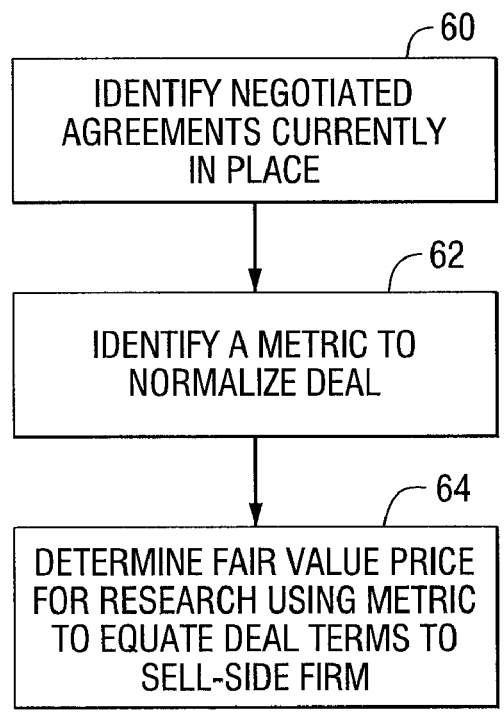

FIG. 9 is a flowchart of another process for determining a fair value price for equity research according to various embodiments of the present invention. The process of FIG. 10 may be used by the known-deal benchmark pricing module 92. The process of FIG. 9 commences at step 60, where negotiated agreements currently in place relating to the cost of equity research are identified. For example, if sell-side firm A is using this process to price equity research, it may identify, such as through press announcements or other industry news services, that a particular buy-side firm pays sell-side firm B $xM for complete access to firm B's research.

Next, at step 62, parameters or metrics to normalize the identified deal are identified. Any parameter or metric acceptable for normalizing the deal may be used. Possible metrics include, but are not limited to, percents of total equity research reports produced by the sell-side firms, number of analysts within the sell-side firms, number of companies covered by the sell-side firms, etc. For example, several services aggregate equity research reports, such as First Call, Bloomberg, Reuters and TheMarkets. Data from these aggregators may be used to determine the percent of total equity research reports produced by the sell-side firms.

Next at step 64, yet another fair value price for equity research provided by a sell-side firm can be determined based on the normalization of the benchmark deal identified at step 60. For instance, in the above example, if sell-side firm B publishes 2% of the total equity research reports aggregated by a particular research report aggregator service and sell-side firm A publishes 10% of the total equity research reports aggregated by the service, the deal between the buy-side firm and sell-side firm A may be worth five times more than the deal with sell-side firm B. Also, for example, if sell-side firm B has 60 analysts and sell-side firm A has 300 analysts, the deal between the buy-side firm and firm A may be worth five times more than the deal with firm B. Also, if sell-side firm B covers 340 companies and sell-side firm A covers 1700 companies, the deal between the buy-side firm and firm A may be worth five times more than the deal with firm B. Thus, one or more fair value prices for equity research provided by sell-side firm A can be determined according to this pricing technique. These prices additionally may be used to frame the discussions between a sell-side firm (sell-side firm A) and a buy-side firm in a discussion concerning the price of the equity research provided by a sell-side firm to the buy-side client. According to other variations, where more than one relevant benchmark deal is identified at step 60, the price determined at step 64 could be an average of the fair value prices determined for each identified deal.

In the above-described processes, the fair value prices for equity research provided by a sell-side firm was computed based on total research, that is, market research covering all market sectors. In other variations of the present invention, the pricing analysis may be performed for individual market sectors (e.g., automotive, semiconductors, software, financial services, etc.). This operation may be performed by the market cap traded overlay module 94 and FIG. 10 is a diagram of the process flow of the market cap traded overlay module 94 according to various embodiments. The process may start at step 70, where a market cap traded factor or percentage for the relevant sector(s) is estimated. The market cap traded percentage may be conceptualized as the market cap traded for a particular sector divided by the market cap traded for all sectors (i.e., the total market cap traded). "Market cap traded" for a particular security may be computed as price times volume for that security. To compute the market cap traded for a sector, according to various embodiments, an appropriate market indice for the relevant region may be used. The market indice may be scaled to reflect only that component of the indice relevant to the market sector of interest. For example, for North America based research, the S&P 500 index may be used. For Europe, the MSCI Europe index may be used. As an example, to compute the market traded for a particular sector in North America, the percentage of the equities included in the S&P 500 belonging to the particular sector may be determined and the market cap for each of companies may be summed. For example, if semiconductor company securities comprise 5% of the S&P 500, the market cap of the twenty-five semiconductor companies included in the S&P 500 may be summed. The sum, in turn, may be divided by the sum of the market cap of all five hundred companies in the S&P 500 to determine the market cap traded percentage (or factor) for the semiconductor sector in North America.

Next, at step 72, the peer average research spend for the relevant sector may be computed. This may be computed by averaging the research spend for the relevant sector for the peer buy-side firms (see, e.g., step 18 of FIG. 2). The research spend for the relevant sector for the peer buy-side firms may be computed by multiplying the peer average research spend by the market cap traded percentage for the relevant sector. This value may represent a fair value price for the equity research provided by a sell-side firm for the relevant sector.

In the above-described process, the fair value price for the equity research for the relevant sector provided by a sell-side firm was computed based on the peer average research spend pricing technique (see FIG. 2). The fair value price for a particular sector may be computed based on other pricing techniques described above, such as the wallet share technique (see FIG. 3), the peer average percentage of commissions allocated to research techniques (see FIGS. 4 and 5), the expense ratio as a percentage of AUM technique (see FIG. 6), the sell-side firm consumption-based techniques (see FIGS. 7 and 8), and the known-deal benchmark technique (see FIG. 9).

Figure 11:
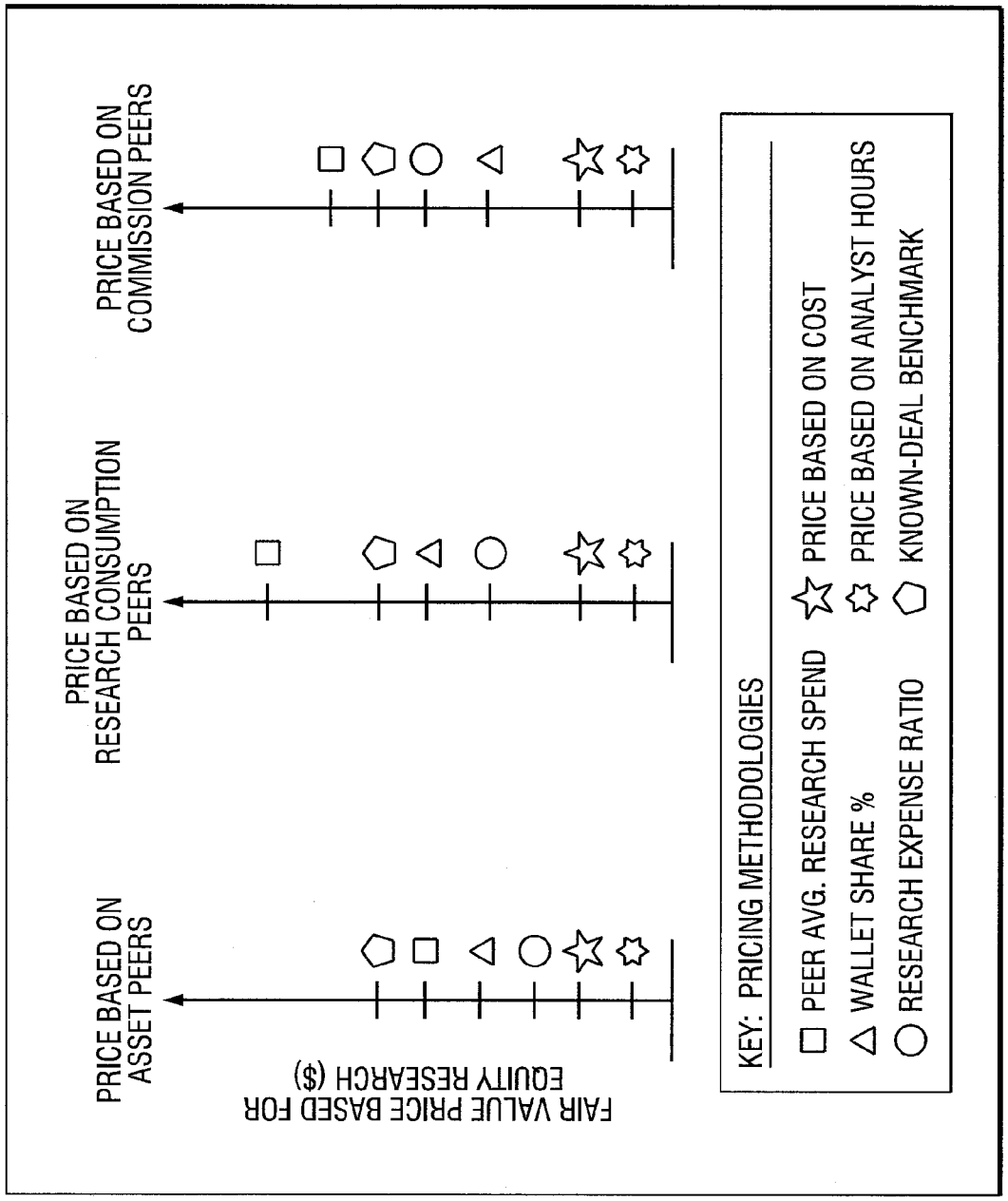
FIG. 11 is a sample chart showing a range of fair value prices for equity research according to various embodiments of the present invention.

As described above, the fair value price output module 96 may compute an average fair value price for equity research based on the fair value prices determined by the modules 84-92 (or an average fair value price for a particular sector based on the sector-specific fair value prices determined by the market cap traded overlay module 94). In addition, the fair value price output module 96 may generate a chart displaying ranges of fair value prices as determined by the respective modules 84-94. As seen in FIG. 11, the chart 110 may include a number of markers (shown in the example of FIG. 11 as the various geometric shapes). Each marker may represent a fair value price computed according to one of the above-described pricing techniques. Further, for pricing techniques related to peer averages (such the techniques of FIGS. 1-6), the chart 110 may include markers for different peer groups. The different peer groups may be, for example, as shown in FIG. 11, assets under management, consumption of research resources and commissions, etc. For the sake of clarity, only a subset of the fair value prices that could be generated using the above described pricing techniques are shown in FIG. 11.

The system 80 may also include a service level pricing module (not shown). The service level pricing module may compute a fair value price for equity research based on the amount spent for research by the client buy-side firm per shares traded by the sell-side firm on behalf of the buy-side firm given the service level of the buy-side firm. For example, the sell-side firm may provide three levels of service to its clients: high, medium and low. Clients in the high service group get the most research service from the sell-side firm and so on. For each group, the service level pricing module may compute a quotient corresponding to the research spend with the sell-side firm for each client in the particular group divided by the number of shares traded by the sell-side firm for each client in the group. Thus, the service level pricing module may compute the research spend per shares traded ratio for each client in each of the groups. The service level pricing module may then determine a curve (i.e., a mathematical equation) that best fits the data points (i.e., the research spend per shares traded ratios for each client) for each group. The curves may then be used to determine a fair value price for equity research for a client buy-side firm based on the service level of the client (e.g., high, medium or low) and the number of shares traded by the sell-side firm for the client.

While several embodiments of the invention have been described, it should be apparent, however, that various modifications, alterations and adaptations to those embodiments may occur to persons skilled in the art with the attainment of some or all of the advantages of the present invention. For example, the steps described above in connection with the various pricing techniques may be performed in various orders. It is therefore intended to cover all such modifications, alterations and adaptations without departing from the scope and spirit of the present invention as defined by the appended claims.

What is claimed is:

1. A computer-implemented method of determining a value of equity research provided by a supplier of equity research to a consumer of equity research, the method comprising:
    receiving by a computer device from a database first data describing a plurality of consumers of the supplier's equity research, the plurality of consumers comprising the consumer, wherein the computer device comprises at least one processor and is in electronic communication with the database;
    determining by the computer device a peer group of the consumer of equity research considering the first data, wherein the peer group comprises peer entities of the consumer selected from the plurality of consumers based at least on, each peer entity's consumption level of resources of the supplier of equity research relative to the consumer's consumption level of resources of the supplier of equity research;
    calculating by the computer device an average amount that the peer entities spend with the supplier for equity research;
    calculating by the computer a value of the equity research based on the average amount that the peer entities spend with the supplier of equity research; and
    transmitting with the computing device data indicating the value of the equity research to an output device in communication with the computer.

2. The method of claim 1, wherein calculating the average amount that the peers of the consumer spend with the supplier for equity research comprises, for each peer, multiplying a total street spend of the peer by a percentage of a total street spend allocated to research by the peer.

3. The method of claim 1, wherein the value of for the equity research is also based on an average wallet share percentage of the supplier for peers of the consumer.

4. The method of claim 1, wherein the value of the equity research is also based on an average percentage of commissions allocated to research by peers of the consumer.

5. The method of claim 1, wherein the value of the equity research is also based on an average amount that peers of the consumer spend with the supplier for equity research as a percentage of assets under management.

6. The method of claim 1, wherein the value of the equity research is also based on an estimated cost plus mark-up of the supplier to provide the equity research to the consumer.

7. The method of claim 1, wherein the value of the equity research is also based on an hourly rate plus mark-up of an estimated number of analyst hours of the supplier to provide the equity research to the consumer.

8. The method of claim 1, wherein the value of the equity research is also based on a scaled price based on a known agreement relating to the provision of equity research.

9. The method of claim 1, wherein the value of the equity research is also based on a research service level of the consumer and a number of shares traded by the provider for the consumer.

10. The method of claim 1, wherein the peer entities of the consumer are determined based on at least one of commissions paid to the supplier, fund type, assets under management, wallet share of the supplier and-turnover-adjusted assets.

11. The method of claim 1, wherein the equity research is for a market sector, and the fair value of the equity research includes value of the equity research prices for the market sector.

12. A computer-implemented system for determining a value of equity research provided by a supplier of equity research to a consumer of equity research, the system comprising:
    a database; and
    a computing device comprising at least one processor and an operatively associated computer readable medium, wherein the computing device is in communication with the database via an electronic network, and wherein the computer readable medium comprises instructions thereon that, when executed by the at least one processor, cause the computing device to:
        receive from the database first data describing a plurality of consumers of the supplier's equity research, the plurality of consumers comprising the consumer;
        determine a peer group of the consumer of equity research considering the first data, wherein the peer group comprises peer entities of the consumer selected from the plurality of consumers based at least on each peer entity's consumption level of resources of the supplier of equity research relative to the consumer's consumption level of resources of the supplier of equity research; and
        calculate an average amount that the peer entities spend with the supplier for equity research;
        calculate a value of the equity research based on the average amount that the peer entities spend with the supplier of equity research; and
        transmit data indicating a the value of the equity research to an output device in communication with the computer.

13. The system of claim 12, wherein calculating the average amount that the peers of the consumer spend with the supplier for equity research comprises, for each peer, multiplying a total street spend of the peer by a percentage of a total street spend allocated to research by the peer.

14. The system of claim 12, wherein the value of the equity research is also based on an average wallet share percentage of the supplier for peers of the consumer.

15. The system of claim 12, wherein the value of the equity research is also based on an average percentage of commissions allocated to research by peers of the consumer.

16. The system of claim 12, wherein the value of the equity research is also based on an average amount that peers of the consumer spend with the supplier for equity research as a percentage of assets under management.

17. The system of claim 12, wherein the value of the equity research is also based on an estimated cost plus mark-up of the supplier to provide the equity research to the consumer.

18. The system of claim 12, wherein the value of the equity research is also based on an hourly rate plus mark-up of an estimated number of analyst hours of the supplier to provide the equity research to the consumer.

19. The system of claim 12, wherein the value of for the equity research is also based on a scaled price based on a known agreement relating to the provision of equity research.

20. The system of claim 12, wherein the value of for the equity research is also based on a research service level of the consumer and a number of shares traded by the provider for the consumer.

21. The system of claim 12, wherein the peer entities of the consumer are determined based on at least one of commissions paid to the supplier, fund type, assets under management, wallet share of the supplier, and turnover-adjusted assets.

22. The system of claim 12, wherein the equity research is for a market sector, and the value of the equity research includes value of the equity research for the market sector.

* * * * *